United States Patent Office 2,993,036
Patented July 18, 1961

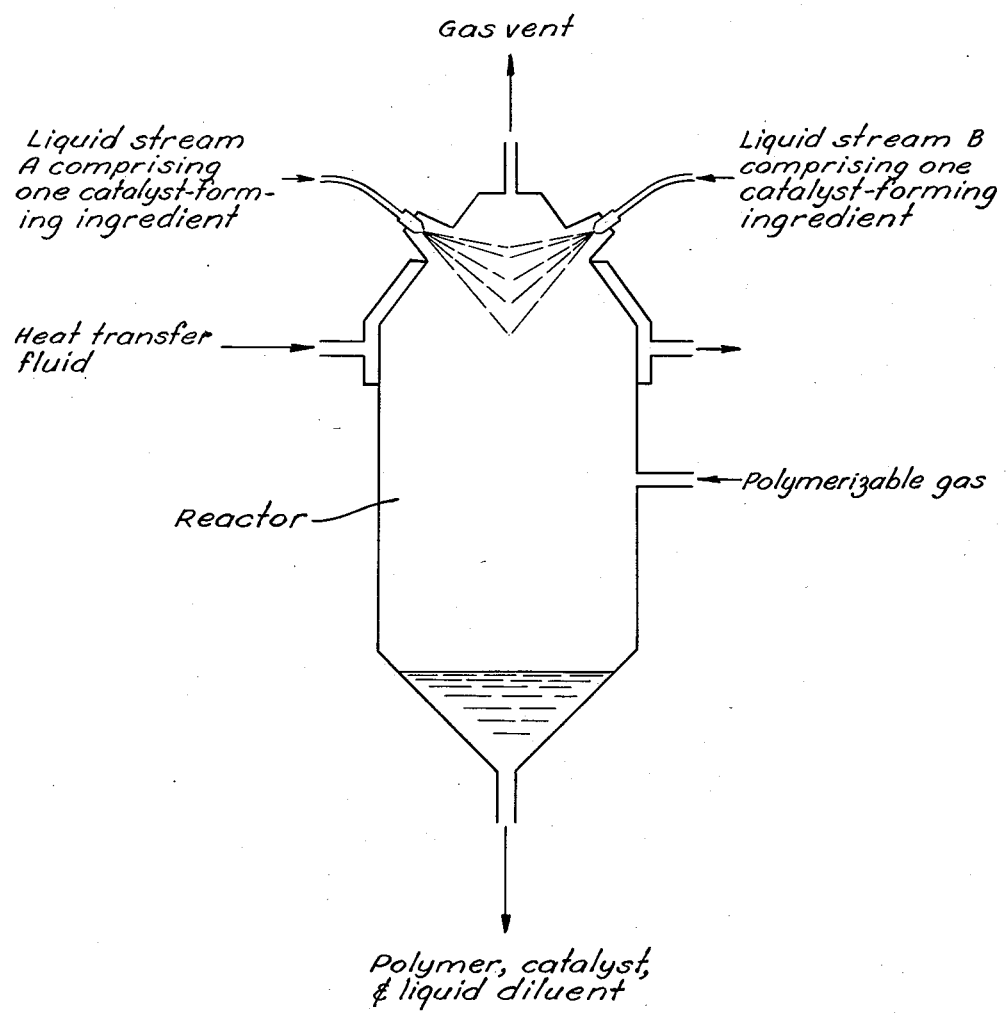

2,993,036
POLYMERIZATION PROCESS
Laddie M. Thomka and Earl T. Heckeroth, Midland, Mich., assignors to The Dow Chemical Company, Midland, Mich., a corporation of Delaware
Filed Apr. 13, 1956, Ser. No. 578,032
6 Claims. (Cl. 260—94.9)

This invention concerns the polymerization of polymerizable organic materials, especially alpha-olefins that are in the gas state at the temperature and pressure of polymerization, such as ethylene, and wherein the polymerization is catalyzed by complex organo-metal catalysts. It relates to a mode of operation wherein the polymerizable organic material is maintained in a polymerization reaction zone in the form of a body of gas, and a liquid composition comprising the complex organo-metal catalyst and an inert liquid diluent is dispersed as droplets in the body of gas. The invention particularly pertains to an improvement in such mode of operation wherein the complex organo-metal catalyst dispersion in an inert diluent liquid is generated in situ in the body of gas comprising the polymerizable organic compound.

This application is a continuation-in-part of a co-pending application, Serial No. 551,907, filed December 8, 1955 by Laddie M. Thomka for "Polymerization Process," now United States Patent 2,906,742 granted September 29, 1959.

In the co-pending application just identified there is described an improvement in the art of polymerizing polymerizable organic materials in the presence of complex organo-metal catalysts. It is known that substantially linear polymers such as high molecular weight polymers of ethylene can be made by contacting the polymerizable monomer such as ethylene with complex organo-metal catalysts dispersed in an inert liquid as medium of the polymerization. The complex organo-metal catalysts that are employed to effect such polymerizations are formed, for example, by mixing an organo-metal strong reducing agent such as a trialkyl aluminum compound and a compound of a heavier metal of groups IV—B, V—B, and VI—B, i.e. metals of the left hand sub-group of groups IV, V, and VI of the Periodic System of the Elements. For example, a complex organo-metal catalyst that is effective in causing ethylene to polymerize to a high molecular weight polymer product is prepared by admixing triisobutyl aluminum and titanium tetrachloride.

The improvement described in the co-pending application hereinbefore identified, comprises maintaining in a polymerization reaction zone a body of gas comprising a polymerizable organic material, e.g. ethylene, and feeding into that body of gas a liquid dispersion of a complex organo-metal catalyst in an inert liquid medium, the liquid dispersion being fed in such a manner as to cause subdivision thereof into unstable discrete droplets in the body of gas. The improved process and the advantages thereof are fully set forth in the reference application.

Although the improved process of the application referred to is advantageous over the prior practice of the art, experience has shown that some difficulties are encountered in extended actual practice. One of these difficulties is that some polymerization occurs at the point of entry of the catalyst-containing liquid dispersion into the gas body containing the polymerizable material, e.g. at the orifice or nozzle through which the catalyst-containing liquid is sprayed into the reactor. Such polymer formation sometimes leads to obstruction of the flow of catalyst-containing liquid dispersion into the reactor. Another difficulty lies in the nature of the catalyst dispersion in the liquid medium. Usually at least a part of the interaction product of the organo-metal strong reducing agent and the heavy metal compound is a solid precipitate that tends to settle out of the liquid medium. Besides tending to obstruct the line and/or nozzle through which the catalyst-containing liquid dispersion is fed into the reactor, the separation of this solid precipitate tends to change the actual catalytic composition of the dispersion. Another difficulty that is encountered is that the catalytic activity of the dispersion of organo-metal catalyst in the inert liquid medium changes upon aging. In consequence, the last (aged) portion of the catalyst dispersion gives rise to polymerization effects when fed into the reactor that differ from the effects obtained with the first (fresh) portion of the same catalyst dispersion.

It is an object of this invention to provide an improvement in polymerization of polymerizable organic materials in contact with complex organo-metal catalysts.

A particular object is to provide an improvement in the process of polymerization wherein a liquid composition comprising a complex organo-metal catalyst in an inert liquid medium is dispersed in a body of gas comprising a polymerizable organic material such as ethylene.

A specific object is to provide an improvement in such process that overcomes the difficulties just described.

Further objects and advantages of the invention are apparent in the following description.

The objects of this invention are attained in an improvement wherein a body of gas comprising, or consisting of, a polymerizable material such as ethylene is maintained in a reaction zone and a liquid composition comprising a complex organo-metal catalyst in an inert liquid medium is dispersed in that body of gas and wherein the complex organo-metal catalyst is generated in situ in the body of gas. It has now been discovered that the method described in the hereinbefore referred to application, Serial No. 551,907 can unexpectedly be further improved by feeding liquid streams comprising the catalyst-forming ingredients separately into the reactor, intermingling such streams and causing the catalyst-forming ingredients to interacts in the body of gas, thereby forming the polymerization catalyst in situ.

The drawing is a schematic representation of an embodiment of the present invention.

The present invention is practiced by maintaining a body of gas comprising, or consisting of, a polymerizable compound such as ethylene in a polymerization reaction zone defined by a suitable reactor. Into the body of gas in the reaction zone there are fed at least two liquid streams. One of these streams comprises one of the catalyst-forming ingredients, e.g. the organo-metal strong reducing agent. Another of these liquid streams comprises the other of the catalyst-forming ingredients, e.g. a compound of a metal of group IV—B, V—B, or VI—B of the periodic system. These several liquid streams are fed into the body of gas in such a manner as to effect intermingling of the liquid streams comprising the catalyst-forming ingredients so as to cause formation of the complex organo-metal catalyst and to obtain dispersion of droplets of liquid comprising such complex organo-metal catalyst in the body of gas. Preferably, the liquid streams are fed into the reactor through spray jets or nozzles so arranged that the liquid sprays impinge on one another in the gas space of the reactor, thereby generating the complex organo-metal catalyst in situ, but so that the liquid spray from neither nozzle impinges on the other nozzle. Since the catalyst-forming ingredients per se are not catalysts of polymerization, the points of entry of the liquid streams comprising the catalyst-forming ingredient are not themselves sites of polymerization, and so do not tend to accumulate polymer deposits.

In accordance with known art, one of the catalyst-forming ingredients is an organo-metal strong reducing agent, e.g. an organo-aluminum compound. Suitable organo-aluminum compounds are alkyl aluminum compounds having one of the generic formulae $R_3Al$, $R_2AlH$, $RAlH_2$, $R_2AlX$, and $RAlX_2$, wherein the symbol R represents an alkyl radical and the symbol X represents a halogen atom, i.e. trialkyl aluminum compounds such as trimethyl aluminum, triethyl aluminum, tripropyl aluminum, triisobutyl aluminum, and trioctyl aluminum, alkyl aluminum hydrides such as diethyl aluminum hydride and ethyl aluminum dihydride, and alkyl aluminum halides such as diethyl aluminum chloride and ethyl aluminum dichloride. The reducing compounds just referred to are organo-aluminum compounds having the formula $RAlY_2$ wherein R is an alkyl radical having from one to eight carbon atoms and Y is a member of the group consisting of alkyl radicals having from one to eight carbon atoms, hydrogen, and halogen. Instead of organo-aluminum compounds there can be used other organo-metal materials such as alkyl zinc or alkyl magnesium compounds.

The other of the catalyst-forming ingredients is a compound of a metal of group IV—B, V—B, or VI—B, of the periodic system, such as one of the halides, oxyhalides, and organic compounds of titanium, zirconium, hafnium, thorium, vanadium, columbium, tantalum, chromium, molybdenum, tungsten, and uranium such as titanium tetrachloride and zirconium acetyl acetonate.

The catalyst-forming ingredients are employed in liquid form preferably dispersed in an inert liquid. Preferably the inert liquid is selected from the class of saturated aliphatic (paraffin) hydrocarbons, cycloaliphatic (cycloparaffin) hydrocarbons, and aromatic hydrocarbons and hydroaromatic hydrocarbons in which there is no non-aromatic unsaturation. For convenient operation, the hydrocarbon should contain from 3 to 12 carbon atoms, preferably from 5 to 12 carbon atoms. Examples of suitable liquids are propane, butane, isobutane, pentane, isopentane, hexanes, heptanes, octanes (especially isooctane), cyclohexane, methylcyclohexane, ethylcyclohexane, decalin, benzene, toluene, xylenes, ethylbenzenes, ethyltoluenes, ethylxylenes, diethylbenzenes, isopropylbenzene, isopropyltoluenes, isopropylxylenes, and tetralin. Mixtures can be used, such as petroleum ether, kerosene, and naphtha.

It is advantageous to provide catalyst-forming ingredients and inert liquids that form homogeneous solutions. Such solutions are uniform in composition throughout and can be pumped and injected into the reactor without obstructing small orifices and jets.

The liquid streams comprising the catalyst-forming ingredients are fed to the reactor at rates to provide a complex organo-metal catalyst of the desired composition. The proportion in which the catalyst-forming ingredients are combined depends on the other conditions of the process and the kind of polymer to be obtained. For example, the number of moles of organo-aluminum compound that is employed per mole of the compound of a metal of group IV, V, or VI is from 0.1 to 3 or more times the valence of the group IV, V, or VI metal in such compound, e.g. from 0.4 to 12 mole-weights of triisobutyl aluminum per mole-weight of titanium tetrachloride, although larger or smaller proportions can be employed. When the heavier metal compound is a metal acetyl acetonate, the organo-aluminum compound is preferably used in larger proportions, e.g. up to 25 mole-weights or more of triisobutyl aluminum per mole weight of zirconium acetyl acetonate.

It is a further feature of this invention that the catalyst composition, i.e. the relative proportions of catalyst-forming ingredients to each other, can be instantly changed by changing the rate of feed of one or more of the liquid streams comprising these catalyst-forming ingredients.

In accordance with the known art and the improvement described in the aforementioned application, Serial No. 551,907, the reaction mixture in the reaction zone is maintained at temperatures from room temperature or below, e.g. 0° C., to about 250° C., preferably between about 40° C. and 150° C. and at any pressure, preferably between 1 and 100 atmospheres.

The invention can be visualized by reference to the drawing, which shows a diagrammatic sketch of one embodiment of apparatus suitable for carrying out this process. The apparatus comprises a reactor vessel for containing a body of the gas comprising, or consisting of, a polymerizable organic material, such as ethylene, supplied through a suitable opening from a source not shown. Into the top of the reactor are fed separate streams (identified as A and B) of liquid comprising one of the catalyst-forming ingredients. The streams of liquid are portrayed as entering the body of gas through spray nozzles. The nozzles are arranged so that the liquid sprays impinge on each other in the gas body, intermingling and forming liquid droplets containing the organo-metal catalyst. Polymerization of the polymerizable organic compound in the gas body takes place on and in the liquid droplets. The liquid droplets and solid particles coalesce, settle out of the gas body, collect at the bottom of the reactor, and are withdrawn as a mixture of polymer, catalyst and liquid diluent.

The polymerization of the polymerizable organic compound such as ethylene is usually exothermic. By proper selection of the liquid medium in the streams containing the catalyst-forming ingredients fed to the gas, the heat of reaction can be removed and the temperature of the catalyst-containing droplets can be controlled by vaporization of at least a part of the liquid diluent from the droplets. Such heat can be removed from the system, e.g. by heat transfer surfaces located in the upper portion of the reactor vessel. The drawing portrays a jacket about the upper portion of the reactor for passage of a heat transfer fluid such as cooling water. Such an arrangement is advantageous in that condensation of the liquid diluent takes place on such cooling surfaces in the upper portion of the reaction vessel, and the resulting liquid condensate flows downward on the inside surfaces of the reactor wall thereby continuously washing such walls and preventing the accumulation of solid residues thereon. Additional heat transfer can be provided elsewhere in the reactor, e.g. at the bottom, but this is usually unnecessary.

The mixture of polymer, catalyst and liquid diluent that is removed from the bottom of the reactor can be treated, e.g. by filtration, to recover the solid polymer therefrom.

The solid polymer product can be treated in known manner, e.g. by washing with alcohols and/or water, to inactivate and to separate the catalyst residue.

When the starting gas comprising a polymerizable organic compound also comprises a non-polymerizable constituent, a gas stream comprising the non-polymerized constituent can be withdrawn from the reactor through a suitable vent outlet as shown in the drawing.

The invention is not limited to particular apparatus, and arrangements of apparatus other than the one shown can be employed provided that means are supplied for carrying out the procedural steps of the method at the requisite conditions. For example, the locations and number of the various inlet and outlet openings in the reactor can be different from those shown in the drawing. In other embodiments, the gas stream comprising the polymerizable starting material can be fed into the reactor through a two-fluid gas-liquid atomizing spray nozzle together with one of the liquid streams comprising a catalyst-forming ingredient, or the starting gas stream can be divided and a portion thereof can be fed with each of the liquid streams comprising the catalyst-forming ingredients through such two-fluid gas-liquid atomizing spray nozzles.

The following example of the polymerization of ethylene illustrates the invention, but should not be construed as limiting its scope.

Ethylene was polymerized in a duo-spray reactor substantially like that shown schematically in the drawing.

Substantially pure ethylene gas at room temperature was fed into the reactor and was maintained therein at about 40 p.s.i.g.

A solution was prepared in liquid hexane of titanium tetrachloride in amount corresponding to 23.3 millimoles of titanium tetrachloride per liter of solution. Another solution was prepared in liquid hexane of triisobutyl aluminum in amount corresponding to 23.3 millimoles of triisobutyl aluminum per liter of solution. The resulting liquid solutions were separately fed, each at a rate of approximately 0.1 gallon per minute, through spray nozzles into the body of ethylene gas in the reactor.

In order to maintain the gas pressure in the reactor at approximately 40 p.s.i.g., the ethylene gas was fed into the reactor at an average rate of 10 pounds per hour.

The temperature inside the reactor was between 30° and 34° C. Cold water was circulated through the jacket on the upper portion of the reactor.

From the bottom of the reactor was drawn a slurry comprising a high molecular weight polyethylene, catalyst and the liquid hexane medium. This slurry was treated with isopropyl alcohol to inactivate the catalyst, and the polymer solid was collected on a filter, washed with water and dried. The molecular weight of the polyethylene product was approximately 146,000 as determined by solution viscosity method.

In place of ethylene there can be employed another ethylenically unsaturated polymerizable organic material, especially one that contains a vinylidene radical, i.e. the group $CH_2=C=$, and particularly an alpha-olefin such as propylene, butene-1, isobutylene, styrene, or mixture thereof. In place of the catalyst composition engendered by admixing triisobutyl aluminum, and titanium tetrachloride, there can be used another of the complex organo-metal catalyst compositions hereinbefore described. In place of hexane there can be used another chemically inert liquid diluent such as one of those hereinbefore indentified.

We claim:

1. In a method wherein an alpha-olefin having from two to three carbon atoms is polymerized in contact with a catalyst composition comprising a complex organo-metal catalyst, the steps of maintaining an alpha-olefin having from two to three carbon atoms in a body of gas in a polymerization reaction zone and polymerizing the alpha-olefin by feeding into that body of gas an unconfined liquid stream of an organo-aluminum compound having the formula $RAlY_2$ wherein R is an alkyl radical having from one to eight carbon atoms and Y is a member of the group consisting of alkyl radicals having from one to eight carbon atoms, hydrogen, and halogen, also feeding into that body of gas an unconfined liquid stream of an inorganic metal halide selected from the group consisting of titanium, vanadium, and zirconium halides, the organo-aluminum compound and the metal halide being of kinds and in amounts whose mixtures are effective catalysts for polymerizing the alpha-olefin, and generating such polymerization catalyst in situ by impinging such streams on one another in the body of gas, intermingling the liquids and dispersing the same in the body of gas into free-falling droplets comprising the resulting catalytic mixture of the organo-aluminum compound and the metal halide.

2. The steps according to claim 1, wherein the organo-alumium compound is a trialkyl aluminum compound and the metal halide is a titanium halide.

3. The steps according to claim 1, wherein the organo-aluminum compound is triisobutyl aluminum and the metal halide is titanium tetrachloride.

4. The steps according to claim 1, wherein the alpha-olefin is ethylene.

5. The steps according to claim 4, wherein the aluminum compound is triisobutyl aluminum.

6. The steps according to claim 4, wherein the aluminum compound is triisobutyl aluminum and the titanium halide is titanium tetrachloride.

References Cited in the file of this patent

UNITED STATES PATENTS

| Number | Name | Date |
| --- | --- | --- |
| 2,300,069 | Skooglund | Oct. 27, 1942 |
| 2,450,547 | Gaylor | Oct. 5, 1948 |
| 2,636,026 | Nelson | Apr. 21, 1953 |
| 2,815,334 | Killey et al. | Dec. 3, 1957 |
| 2,846,426 | Larson et al. | Aug. 5, 1958 |
| 2,862,917 | Anderson et al. | Dec. 2, 1958 |

FOREIGN PATENTS

| Number | Country | Date |
| --- | --- | --- |
| 533,362 | Belgium | May 16, 1955 |